United States Patent
DeLuca et al.

(10) Patent No.: US 11,561,932 B2
(45) Date of Patent: Jan. 24, 2023

(54) COGNITIVE DIGITAL FILE NAMING

(71) Applicant: INTERNATIONAL BUSINESS MACHINES CORPORATION, Armonk, NY (US)

(72) Inventors: Lisa Seacat DeLuca, Baltimore, MD (US); Kelley Anders, East New Market, MD (US); Jeremy R. Fox, Georgetown, TX (US); Dana L. Price, Surf City, NC (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 16/934,136

(22) Filed: Jul. 21, 2020

(65) Prior Publication Data

US 2022/0027316 A1    Jan. 27, 2022

(51) Int. Cl.
  *G06F 16/16* (2019.01)
  *G06F 16/14* (2019.01)
  *G06F 9/54* (2006.01)

(52) U.S. Cl.
  CPC ............ *G06F 16/164* (2019.01); *G06F 9/542* (2013.01); *G06F 16/14* (2019.01)

(58) Field of Classification Search
  CPC ......... G06F 16/164; G06F 16/14; G06F 9/542
  See application file for complete search history.

(56) References Cited

U.S. PATENT DOCUMENTS

| | | | |
|---|---|---|---|
| 5,513,351 A | 4/1996 | Grantz | |
| 5,745,750 A | 4/1998 | Porcaro | |
| 7,647,402 B2 | 1/2010 | McBrearty | |
| 8,588,578 B2 | 11/2013 | Gasper | |
| 9,690,798 B2 | 6/2017 | Balakrishnan | |
| 9,946,717 B2 | 4/2018 | Lim | |
| 9,959,287 B2 | 5/2018 | Besen | |

(Continued)

FOREIGN PATENT DOCUMENTS

| | | | |
|---|---|---|---|
| CN | 101853009 A | * | 10/2010 |
| CN | 103336821 A | | 10/2013 |

(Continued)

OTHER PUBLICATIONS https://download.cnet.com/File-Renamer-Pro/3000-2248_4-10766041.html, File Renamer Pro, Printed Jun. 29, 2020, pp. 1-5.

(Continued)

*Primary Examiner* — Hosain T Alam
*Assistant Examiner* — Anthony G Gemignani
(74) *Attorney, Agent, or Firm* — Daniel J. Hakimi

(57) ABSTRACT

The exemplary embodiments disclose a system and method, a computer program product, and a computer system for naming a digital file. The exemplary embodiments may include detecting a user saving an unnamed digital file to a digital folder, extracting one or more first features from data collected from one or more named digital files within the digital folder, generating one or more models correlating the extracted one or more first features with one or more names of the one or more named digital files, extracting one or more second features from the unnamed digital file, and determining a name for the unnamed digital file based on applying the one or more models to the extracted one or more second features.

20 Claims, 5 Drawing Sheets

(56) References Cited

U.S. PATENT DOCUMENTS

| | | | |
|---|---|---|---|
| 2013/0282658 A1 | 10/2013 | Besen | |
| 2018/0060344 A1 | 3/2018 | Layzell | |
| 2018/0067957 A1* | 3/2018 | Paterson | G06F 16/93 |
| 2019/0095455 A1 | 3/2019 | Barreto | |
| 2021/0334238 A1* | 10/2021 | Bikumala | G06N 20/00 |

FOREIGN PATENT DOCUMENTS

| | | | | |
|---|---|---|---|---|
| CN | 103778157 A | | 5/2014 | |
| CN | 109063105 A | * | 12/2018 | G06N 3/08 |
| CN | 110263007 A | * | 9/2019 | G06F 16/16 |
| JP | 2002215643 A | * | 8/2002 | |
| JP | 2006086887 A | * | 3/2006 | |
| JP | 4017887 B2 | * | 12/2007 | G10L 15/07 |
| JP | 2010224901 A | * | 10/2010 | |

OTHER PUBLICATIONS https://www.advancedrenamer.com/ "Advanced Renamer," AdvancedRenamer.com, Printed Jun. 29, 2020, pp. 1-5.

Iacobelli, "5 Intelligent Skills to Add to Your Box Folders With No Code", https://medium.com/@giuliano/5-intelligent-skills-to-add-to-your-box-fo . . . , May 29, 2018, pp. 1-3.

IBM "IBM Business Automation Workflow,", https://www.ibm.com/products/business-automation-workflow, Printed Jun. 2, 2020, pp. 1-7.

Mell et al., "The NIST Definition of Cloud Computing", National Institute of Standards and Technology, Special Publication 800-145, Sep. 2011, pp. 1-7.

Wikipedia, "File Net", https://en.wikipedia.org/wiki/FileNet, printed Jun. 29, 2020, pp. 1-5.

* cited by examiner

COGNITIVE DIGITAL FILE NAMING

BACKGROUND

The exemplary embodiments relate generally to digital files, and more particularly to naming digital files based on data.

It can be very difficult for a person to individually name multiple digital files. It can also be very difficult for the person to implement consistent naming nomenclature across a large number of digital files. The person may need to consider a lot of information about the digital files in naming them appropriately based on a naming nomenclature.

SUMMARY

The exemplary embodiments disclose a system and method, a computer program product, and a computer system for naming a digital file. The exemplary embodiments may include detecting a user saving an unnamed digital file to a digital folder, extracting one or more first features from data collected from one or more named digital files within the digital folder, generating one or more models correlating the extracted one or more first features with one or more names of the one or more named digital files, extracting one or more second features from the unnamed digital file, and determining a name for the unnamed digital file based on applying the one or more models to the extracted one or more second features.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
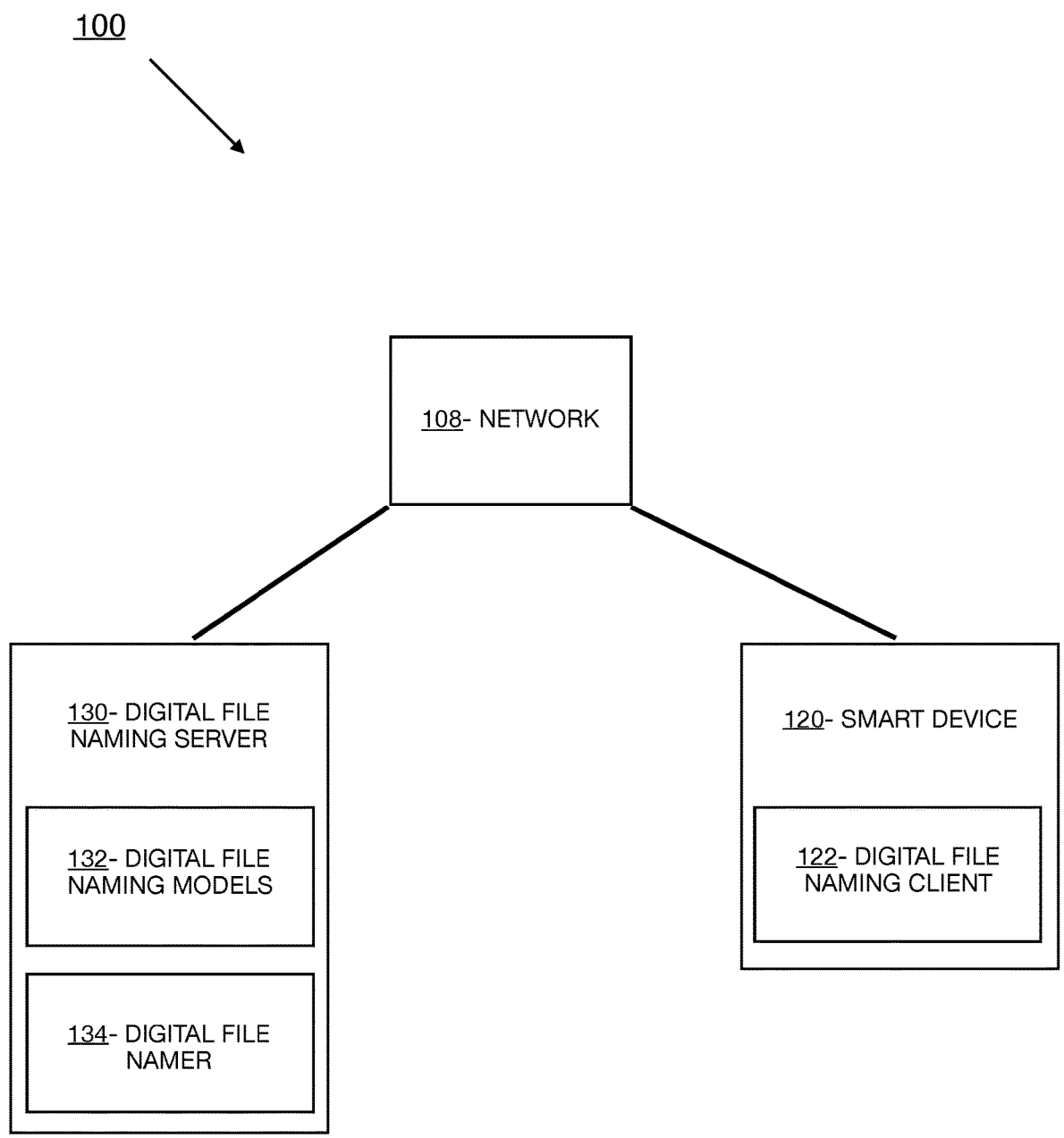
FIG. 1 depicts an exemplary schematic diagram of a digital file naming system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

It can be very difficult for a person to individually name multiple digital files. It can also be very difficult for the person to implement consistent naming nomenclature across a large number of digital files. The person may need to consider a lot of information about the digital files in naming them appropriately based on a naming nomenclature. Accordingly, there is a critical need for a system to account for not only the features present in a digital file, but also the significance of the different features in order to appropriately name digital files.

Exemplary embodiments are directed to a method, computer program product, and computer system that will name digital files. In embodiments, machine learning may be used to create models capable of determining an appropriate name for one or more digital files, while feedback loops may improve upon such models. Moreover, data from a user's smart device 120, the internet, social networks, and user profiles may be utilized to improve digital file naming. In embodiments, such digital files may refer to any file stored in any location, for example a local or remote hard drive. A user may wish to name multiple digital files for a variety of different purposes or motivations in a variety of different contexts. For example, a photographer may wish to organize thousands of photos based on clients photographed in the photos or based on the dates the photographs were taken. An author may wish to organize text files based on the names of the files or types of projects they belong to. A computer programmer may wish to organize code files based on the computer programming language they were written in or based on the revision version numbers of the code files. A user may further wish to change the names of multiple digital files that had previously been named according to a past naming nomenclature to conform to a new naming nomenclature. A user may wish to modify an old naming nomenclature for various reasons such as an organization name change, changes within a predictive model, new introduction of technical terms, evolution of corpus of data, enterprise content management modeling, threshold metadata tagging, document workflow management, etc. For example, if an organization changed its name, the user may wish to change the old organization name to the new organization name in each of the user's existing digital file names. In general, it will be appreciated that embodiments described herein may relate to the naming or renaming of digital files within any context and for any motivation.

FIG. 1 depicts the digital file naming system 100, in accordance with the exemplary embodiments. According to the exemplary embodiments, the digital file naming system 100 may include a smart device 120, and a digital file naming server 130, which may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the digital file naming system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the smart device 120 includes a digital file naming client 122 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 3, as part of a cloud implementation with reference to FIG. 4, and/or as utilizing functional abstraction layers for processing with reference to FIG. 5.

The digital file naming client 122 may be a software and/or hardware application capable of communicating with and providing a user interface for a user to interact with a server, for example the digital file naming server 130, via the network 108. The digital file naming client 122 may act as a client in a client-server relationship. Moreover, in the example embodiment, the digital file naming client 122 may be capable of transferring data between the smart device 120 and other devices via the network 108. In embodiments, the digital file namer 134 utilizes various wired and wireless connection protocols for data transmission and exchange, including Bluetooth, 2.4 gHz and 5 gHz internet, near-field communication, Z-Wave, Zigbee, etc. The digital file naming client 122 is described in greater detail with respect to FIG. 2.

In the exemplary embodiments, the digital file naming server 130 includes one or more digital file naming models 132 and a digital file namer 134. The digital file naming server 130 may act as a server in a client-server relationship with the digital file naming client 122, and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the digital file naming server 130 is shown as a single device, in other embodiments, the digital file naming server 130 may be comprised of a cluster or plurality of computing devices, working together or working independently. The digital file naming server 130 is described in greater detail as a hardware implementation with reference to FIG. 3, as part of a cloud implementation with reference to FIG. 4, and/or as utilizing functional abstraction layers for processing with reference to FIG. 5.

The digital file naming models 132 may be one or more algorithms modelling a correlation between one or more features and a naming of a digital file. The one or more features may include characteristics relating to a digital file to be named by the digital file naming system 100, to other digital files within a same digital folder, and/or to other digital files of the smart device 120. Such digital file features may include sizes, types, current names, previous names, versions, topics, structure, tags, keywords, metadata, hashtags, file extensions/formats, dates and times created, etc., and may be detected and extracted via the network 108. In embodiments, the digital file naming models 132 may weight the features based on an effect that the one or more features have on the naming of a digital file. In the example embodiment, the digital file namer 134 may generate the digital file naming models 132 using machine learning methods, such as neural networks, deep learning, hierarchical learning, Gaussian Mixture modelling, Hidden Markov modelling, and K-Means, K-Medoids, or Fuzzy C-Means learning, etc. The digital file naming models 132 are described in greater detail with reference to FIG. 2.

The digital file namer 134 may be a software and/or hardware program capable of receiving a configuration of the digital file naming system 100 and detecting a user saving a digital file to a folder. Moreover, the digital file namer 134 may be further configured for collecting data, extracting features from the data, training one or more digital file naming models 132, and applying one or more digital file naming models 132 to name the digital file. The digital file namer 134 is further capable of notifying the user of the determined digital file name and altering the name of the digital file. Lastly, the digital file namer 134 is capable of evaluating the digital file name, and adjusting its models based on the evaluation. The digital file namer 134 is described in greater detail with reference to FIG. 2.

Figure 2:
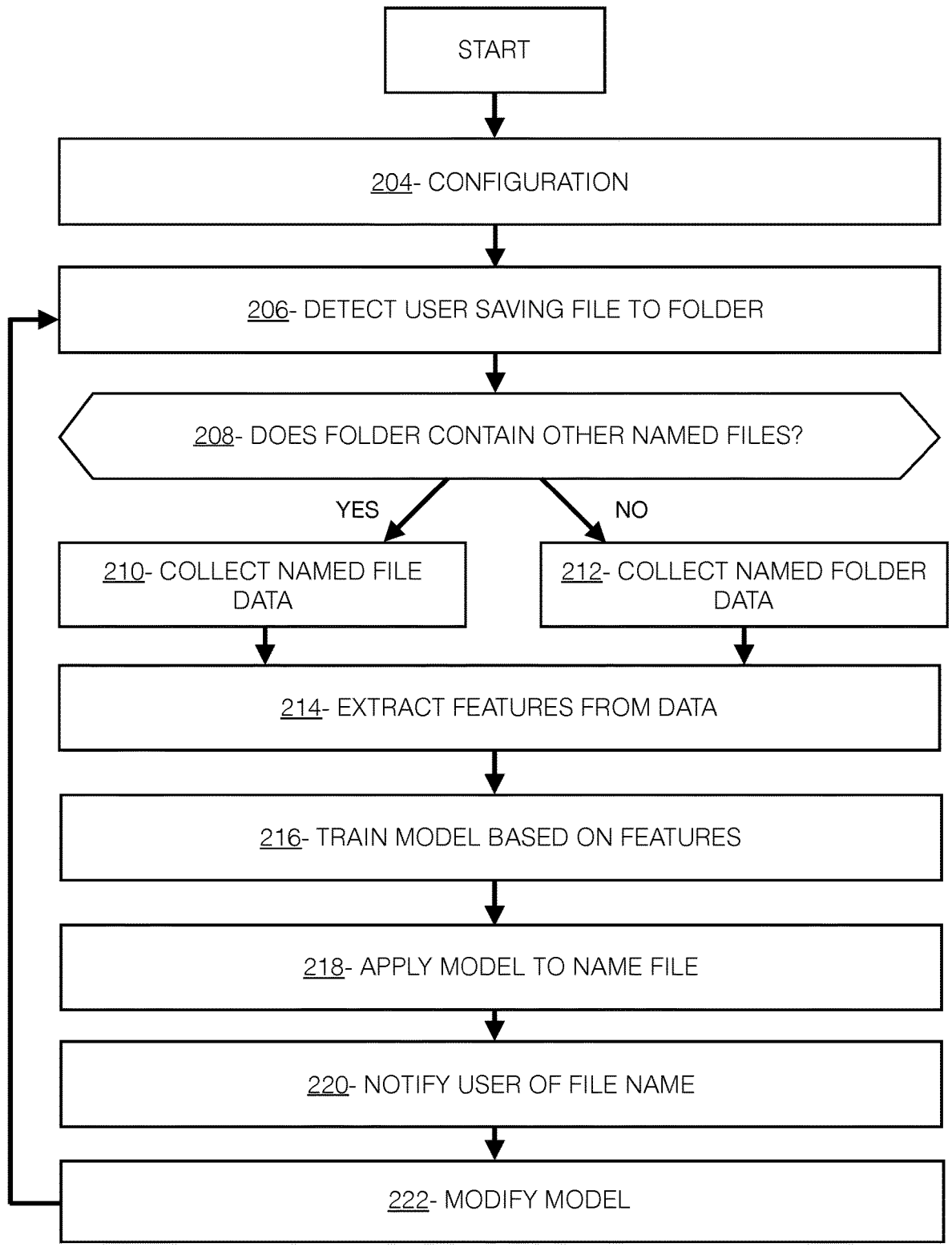
FIG. 2 depicts an exemplary flowchart illustrating the operations of a digital file namer 134 of the digital file naming system 100 in naming one or more digital files, in accordance with the exemplary embodiments.

FIG. 2 depicts an exemplary flowchart illustrating the operations of a digital file namer 134 of the digital file naming system 100 in naming digital files, in accordance with the exemplary embodiments.

The digital file namer 134 may receive a configuration (step 204). The digital file namer 134 may be configured by receiving information such as a user registration and user preferences. The user registration and user preferences may be uploaded by a user or administrator, i.e., the owner of the smart device 120 or the administrator of smart device 120. For example, the administrator may be an owner/user of the device, a guardian of a minor who uses the device, an employer of a phone-provided employee, etc. In the example embodiment, the configuration may be received by the digital file namer 134 via the digital file naming client 122 and the network 108. Receiving the user registration may involve receiving information such as a name, phone number, email address, account credentials (i.e., telephone account, video-chat/web conference, etc.), company name, serial number, smart device 120 type, and the like. Receiving a user registration may also involve receiving the location of or a link to user databases such as a user's digital file logs, previous naming nomenclatures, etc. For example, the digital file namer 134 may extract one or more previous digital file naming nomenclatures from digital files of a previous computer hard drive back-up.

During configuration, the digital file namer 134 may further receive user preferences (step 204 continued). User preferences may include the manner in which the digital file namer 134 should notify the user of a digital file name, for example, via text, audio, video, augmented reality, etc. User preferences may additionally include preferences as to which digital file names may be automatically changed or modified without user input. For example, the digital file namer 134 may be configured to automatically change a digital file name when there are two or more digital files saved to the same digital folder, and may be configured to require user input to confirm a name change of a digital file when there are fewer than two digital files in the folder.

To further illustrate the operations of the digital file namer 134, reference is now made to an illustrative example where the user uploads a user registration for their computer as smart device 120 along with a link to a previous computer hard drive backup. The user further uploads user preferences requesting textual feedback of new digital file name suggestions on the user's computer screen when there are fewer than four digital files saved to the same folder.

The digital file namer 134 may detect a user saving a digital file to a folder (step 206). In embodiments, the digital file namer 134 may detect a user saving a digital file to a folder via user interactions such as a save, upload, or drag and drop to a folder. The digital file namer 134 may detect a user saving a digital file to a folder via integration and communication of the digital file naming client 122 with the operating system of the smart device 120. In embodiments, the digital file namer 134 may proactively intercept an attempt by a user to save a file. For example, the digital file namer 134 may be triggered by a user selecting a "Save as" operation and run prior to opening the "Save as" window. Similarly, the digital file namer 134 may be triggered by the user dragging and dropping or uploading a file to a folder and operate prior to completing the transfer. In other embodiments, the digital file namer 134 may operate retroactively and, for example, analyze files in a folder on a user input or periodic basis. The digital file being saved to a folder may be referred to as an unnamed digital file. In embodiments, the unnamed digital file may in fact have a name, but its name may not be an optimal name for the digital file.

With reference again to the previously introduced example where the digital file namer 134 receives a configuration, the digital file namer 134 detects the user uploading a file named "Meeting 2 Summary" to a folder on the user's computer hard drive named "Team Meeting Summaries."

Upon detecting the saving of a digital file to a folder by the smart device 120, the digital file namer 134 may proceed to determine whether the folder contains any other named digital files (decision 208). The digital file namer 134 may determine whether the folder contains any other named digital files via integration and communication of the digital file naming client 122 with the operating system of the smart device 120. If the digital file namer 134 determines that the folder does contain one or more other named files (decision 208 "YES" branch), the digital file namer 134 may proceed to collect data of the one or more other named files (step 210). If the digital file namer 134 determines that the folder does not contain one or more other named files (decision 208 "NO" branch), the digital file namer 134 may proceed to collect data of the named folder (step 212).

Upon determining that the digital folder contains one or more other named digital files (decision 208 "YES" branch), the digital file namer 134 may collect data of the one or more named files (step 210). The digital file namer 134 may collect file data such as sizes, types, current names, previous names, versions, topics, structure, tags, keywords, metadata, hashtags, file extensions/formats, dates and times created, etc. from one or more hard drives of the smart device 120 or the network 108. In embodiments, the digital file namer 134 may additionally collect data of the file being uploaded to the folder and data of the folder where the file is being uploaded. In embodiments, the digital file namer 134 may further collect data of other files and/or folders, such as files and folders saved to a similar storage location as the location of the folder receiving the uploaded file. For example, if a file is uploaded to a folder saved to a computer hard drive, the digital file namer 134 may collect data of other folders and files saved to the computer hard drive. If a file is uploaded to a folder saved to a corporate server via the network 108, the digital file namer 134 may collect data of other folders and files saved to the corporate server. The digital file namer 134 may additionally collect data of sub-folders and parent folders. For example, suppose a user named multiple image files to sub-folder "January" within the following directory structure: Pictures>Family>2020>January. The digital file namer 134 may collect files and data of files within folders Pictures, Family, 2020, and January.

In addition to collecting data of one or more digital files and folders, the digital file namer 134 may also collect data of a user's behavior within the folder containing the digital file to be named (step 210 continued). The digital file namer 134 may collect data of a user's behavior via integration and communication of the digital file naming client 122 with the operating system of the smart device 120. For example, the digital file namer 134 may collect data of a user frequently adding their initials to the end of digital file names, adding timestamps and dates to the beginning of digital file names, naming files to match the name of the folder followed by an incrementing counter (ex. Essay001, Essay 002, . . . , Essay 00N), adding a certain prefix or suffix to the file name, adding their favorite color or animal, etc. to digital file names within the digital folder. The digital file namer 134 may collect data of a user interacting with a digital folder in one or more of the above methods.

With reference again to the previously introduced example where the digital file namer 134 detects the user uploading a file named "Meeting 2 Summary" to a folder on the user's computer hard drive named "Team Meeting Summaries," the digital file namer 134 collects the "Meeting 2 Summary" file and other files named "Meeting 1 Summary: Hiring V3" and "Miscellaneous Notes" that are saved to the "Team Meeting Summaries" folder. The digital file namer 134 additionally collects data of the files such as sizes, types, current names, previous names, versions, topics, structure, tags, keywords, metadata, hashtags, file extensions/formats, and dates and times created, as well as data of the user previously changing the name of a file from "Meeting Summary" to "Meeting 1 Summary".

Upon determining that the digital folder does not contain one or more other named digital files (decision 208 "NO" branch), the digital file namer 134 may collect data of the named folder (step 212). The digital file namer 134 may collect folder data such as size, type, current name, previous names, versions, topics, structure, tags, keywords, metadata, hashtags, file extensions/formats, date and time created, etc. from one or more hard drives of the smart device 120 or the network 108. In embodiments, the digital file namer 134 may additionally collect data of the file being uploaded to the folder. In embodiments, the digital file namer 134 may further collect data of other files and/or folders, such as files and folders saved to a similar storage location as the location of the folder receiving the uploaded file. For example, if a file is uploaded to a folder saved to a computer hard drive, the digital file namer 134 may collect data of other folders and files saved to the computer hard drive. If a file is uploaded to a folder saved to a corporate server via the network 108, the digital file namer 134 may collect data of other folders and files saved to the corporate server. The digital file namer 134 may additionally collect data of sub-folders and parent folders. For example, suppose a user named multiple image files to sub-folder "January" within the following directory structure: Pictures>Family>2020>January. The digital file namer 134 may collect files and data of files within folders Pictures, Family, 2020, and January.

In embodiments where a digital file to be named is uploaded to a digital folder containing no other digital files, the digital file namer 134 may determine that the digital file to be named should be named according to the naming nomenclature of the folder receiving the digital file (step 212 continued). In other embodiments wherein the save folder has no other files, the digital file namer 134 may prompt the user to select an alternate digital file with an appropriate naming nomenclature and name the digital file according to the selected digital file's naming nomenclature. In some embodiments, the digital file namer 134 may prompt the user to select an alternate digital folder containing one or more digital files so that the digital file namer 134 may collect data of the digital files of the alternate digital folder and data of the alternate digital folder, extract features from the data, and apply one or models to name the digital file based on the extracted features. In embodiments, the digital file namer 134 may be configured alternatively.

The digital file namer 134 may extract features from the collected data (step 214). Such features may be extracted using techniques such as feature extraction, natural language processing, optical character recognition, image recognition/processing, video processing, pattern/template matching, data comparison, etc., and may be extracted from the collected data. The extracted features may include features of one or more digital files and/or digital folders such as sizes, types, current names, previous names, versions, topics, structure, tags, keywords, metadata, hashtags, file extensions/formats, dates and times created, location at which the files were created (e.g., as determined by GPS), etc. In embodiments, features such as digital file and folder sizes, types, current names, previous names, versions, tags, dates and times created, etc. may be extracted using natural language processing from the smart device 120's hard drive, a server accessed via the network 108, or the smart device 120's integration of the digital file naming client 122 with the operating system of the smart device 120. In embodiments, features such as digital file and folder topics, structures, keywords, etc. may be extracted from the content of digital files and/or folders. For example, the digital file namer 134 may utilize natural language processing to determine that a file that includes text detailing adjusting a budget relates mostly to the topic "budget." The digital file namer 134 may utilize optical character recognition to determine that a file with a photo of a computer error message relates to the topic "technical support." In embodiments, the digital file namer 134 may determine via pattern matching that a text file with a header, introduction, steps performed, results, analysis, and conclusion has the structure/format of a laboratory report, while a text file with modern language association format (MLA format) has the structure of an essay. Additionally, the digital file namer 134 may utilize image processing and image recognition to extract the topic "Mary's birthday" from an image file of Mary with a cone shaped hat on her head while blowing out candles on a cake. The digital file namer 134 may additionally extract topic "San Diego Zoo" if the image file additionally depicts wild animals behind Mary and has the tag "San Diego."

With reference to the example above where the digital file namer 134 collects data of the "Meeting 2 Summary" file as well as data of the "Meeting 1 Summary: Hiring V3" file and "Miscellaneous Notes" file saved to the "Team Meeting Summaries" folder, the digital file namer 134 extracts the sizes, types, current names, previous names, previous versions, topics, structures, dates created, and times created of "Meeting 1 Summary: Hiring V3," "Meeting 2 Summary," and "Miscellaneous Notes." In particular, the digital file namer 134 extracts the features illustrated by Table 1.

TABLE 1

| | |
|---|---|
| size | 20 KB |
| type | .docx |
| current name | Meeting 2 Summary |
| previous name | July 10 Meeting |
| previous versions | 4 |
| topic | budget modification |
| structure | summary |
| date created | July 10 |
| time created | 9:30 am EST |

The diagnosis and resolution assessor 134 may train one or more digital file naming models 132 based on the extracted features (step 216). In embodiments, the digital file namer 134 may train a model of the digital file naming models 132 for each type of file within a folder or each type of file saved to a common storage location, and do so based on an association between the one or more features extracted for that file type and a corresponding name assigned to the file by the user. In particular, the digital file naming models 132 may correlate the features extracted from user-named files (merely "named files" hereafter) with a naming nomenclature of those user-named files. In doing so, the digital file naming models 132 capture user naming structure and preferences that can be leveraged by the digital file namer 134 in order to autonomously name newly saved files. For example, the digital file namer 134 may generate one model for text files, a second model for image files, and a third model for video files, each having different extracted features.

In embodiments, the digital file naming models 132 may associate the naming nomenclature of a named digital file with one or more features of the named digital file (step 216 continued). A digital file naming nomenclature may include but is not limited to adding or utilizing one or more of a user's initials, timestamp, digital folder name, version number, one or more number, incremental counter, prefix, suffix, favorite color, favorite animal, etc. in any combination or order. For example, if a user named a text file "January_21_Meeting 2", the digital file naming models 132 may associate text files with naming nomenclature [month created]_[date created]_[file topic]_[number counter]. If an image file within the directory structure Pictures>Family>2020>January was named "familypictures002", the digital file naming models 132 may associate image files with a naming nomenclature consisting of a common name such as "familypictures" and a suffix enumerating the new files, such as familypictures001, familypictures002, . . . familypicturesN. The digital file naming models 132 may similarly associate various digital file types and other digital file features with various naming nomenclatures. In embodiments, the digital file namer 134 may train the one or more digital file naming models 132 to weight the features such that features shown to have a greater correlation with an appropriate naming nomenclature are weighted greater than those features that are not. Based on the digital file naming models 132's extracted features and weights associated with such extracted features, the digital file namer 134 may then generate a name for a digital file.

With reference again to the previously introduced example where the digital file namer 134 extracts the sizes, types, current names, previous names, previous versions, topics, structures, dates created, and times created of "Meeting 1 Summary: Hiring V3," "Meeting 2 Summary," and "Miscellaneous Notes," the digital file namer 134 trains a digital file naming model 132 based on associations of the features with naming nomenclatures assigned by the user.

The digital file namer 134 may apply one or more models to the extracted features to name an unnamed digital file (step 218). As previously discussed, an unnamed digital file may in fact have a name, but its name may not be an optimal name. In embodiments, the digital file namer 134 may apply the one or more digital file naming models 132 to the extracted features of a digital file to determine an optimal naming nomenclature for an unnamed digital file. As used herein, the optimal naming nomenclature may be a nomenclature most likely to be used by the user as determined by applying the digital file naming models 132. As previously mentioned, such extracted features may include digital file sizes, types, current names, previous names, versions, topics, structures, tags, keywords, metadata, hashtags, file extensions/formats, dates and times created, location of creation as determined by GPS, etc., and the one or more digital file naming models 132 may be generated through machine learning techniques such as neural networks. The digital file naming models 132 may weight the features based on an effect each particular feature has on determining an appropriate naming nomenclature.

Upon determining a best naming nomenclature to be applied to the unnamed digital file, the digital file namer 134 may apply the naming nomenclature to name the digital file (step 218 continued). A digital file naming nomenclature may include but is not limited to adding or utilizing one or more of a user's initials, timestamp, digital folder name, version number, one or more number, incremental counter, prefix, suffix, favorite color, favorite animal, etc. in any combination or order. For example, suppose a user added multiple image files to a sub-folder within the following directory structure: Pictures>Family>2020>January. Each file may be suggested to be renamed with a naming nomenclature consisting of a common name such as "familypictures" and a suffix enumerating the new files, such as familypictures001, familypictures002, . . . familypicturesN. Alternatively, if the digital file namer 134 recognizes that existing files are already within the "January" folder with the name Montana2020, the digital file namer 134 may determine that Montana2020 is a common file name of peer files and the appropriate naming nomenclature to be implemented. The digital file namer 134 may then suggest "Montana2020N+1" to continue a naming pattern and sequence where N is the last unique identifier in the sequence. In another example where a user uploads the file almdnsdoislksn.mp4, which is a meeting recording, into the BusinessOpsWeeklyReview folder, the digital file namer 134 may rename the file "BusinessOpsWeeklyReview_20180504.mp4." Similarly, in shared folders, a certain naming convention may be adopted, for example saved file "doc1.txt" may be changed to "doc1-dlp.txt" or "doc1-lsd.txt" where dlp and lsd are the initials of different users uploading or saving their input. In embodiments, the digital file namer 134 may be configured alternatively.

With reference again to the previously introduced example where the digital file namer 134 trains a digital file naming model 132 based on associations of the features with naming nomenclatures assigned by the user, the digital file namer 134 applies the digital file naming models 132 to the extracted features to determine that "Meeting 2 Summary" should be named "Meeting 2 Summary: Budget Modification V5."

The digital file namer 134 may notify the user of the determined digital file name (step 220). A notification or suggestion to the user may be in the form of audio, video, text, etc. and may convey information to the user in any manner. In embodiments, the digital file namer 134 may be configured to name the digital file according to the determined digital file name without first notifying or suggesting the determined digital file name to the user. In embodiments, the user may be capable of further modifying the name of the digital file.

With reference again to the previously introduced example where the digital file namer 134 applies the digital file naming models 132 to the extracted features to determine that "Meeting 2 Summary" should be renamed "Meeting 2 Summary: Budget Modification V5," the digital file namer 134 prompts the user with a text notification on their computer screen saying, "Suggestion: Rename 'Meeting 2 Summary' to 'Meeting 2 Summary: Budget Modification V5.'"

The digital file namer 134 may evaluate and modify the models (step 222). In the example embodiment, the digital file namer 134 may verify whether the digital file name was appropriately generated in order to provide a feedback loop for modifying the digital file naming models 132. In embodiments, the feedback loop may simply provide a means for a user to indicate whether the digital file name was in fact appropriately generated. For example, the digital file namer 134 may prompt a user to select an option indicative of whether the digital file name was correctly generated. The option may comprise a toggle switch, button, slider, etc. that may be selected by the user manually by hand using a button/touchscreen/etc., by voice, by eye movement, and the like. Based on the digital file namer 134 appropriately or inappropriately naming a digital file, the digital file namer 134 may modify the digital file naming models 132. In other embodiments, the digital file namer 134 may infer or deduce whether the digital file was appropriately named, for example if the user immediately changes the digital file name to the suggested digital file name or to a different name. In some embodiments, the digital file namer 134 may interpret user dialogue via natural language processing to determine whether the digital file was appropriately named. For example, if the user says "That is the wrong file topic" or other expressions indicative of a user's dissatisfaction with a digital file name, the digital file namer 134 may infer that the digital file was incorrectly named and modify the digital file naming models 132 accordingly. Based on feedback received in the above or any other manners, the digital file namer 134 may then modify the digital file naming models 132 to more accurately name digital files.

With reference again to the previously introduced example where the digital file namer 134 prompts the user with a text notification on their computer screen saying, "Suggestion: Rename 'Meeting 2 Summary' to 'Meeting 2 Summary: Budget Modification V5,'" the digital file namer 134 detects the user changing the name of file "Meeting 2 Summary" to "Meeting 2 Summary: Budget Modification V5," and the digital file namer 134 adjusts the digital file naming models 132 to more heavily weight the features used in determining the digital file's name.

Figure 3:
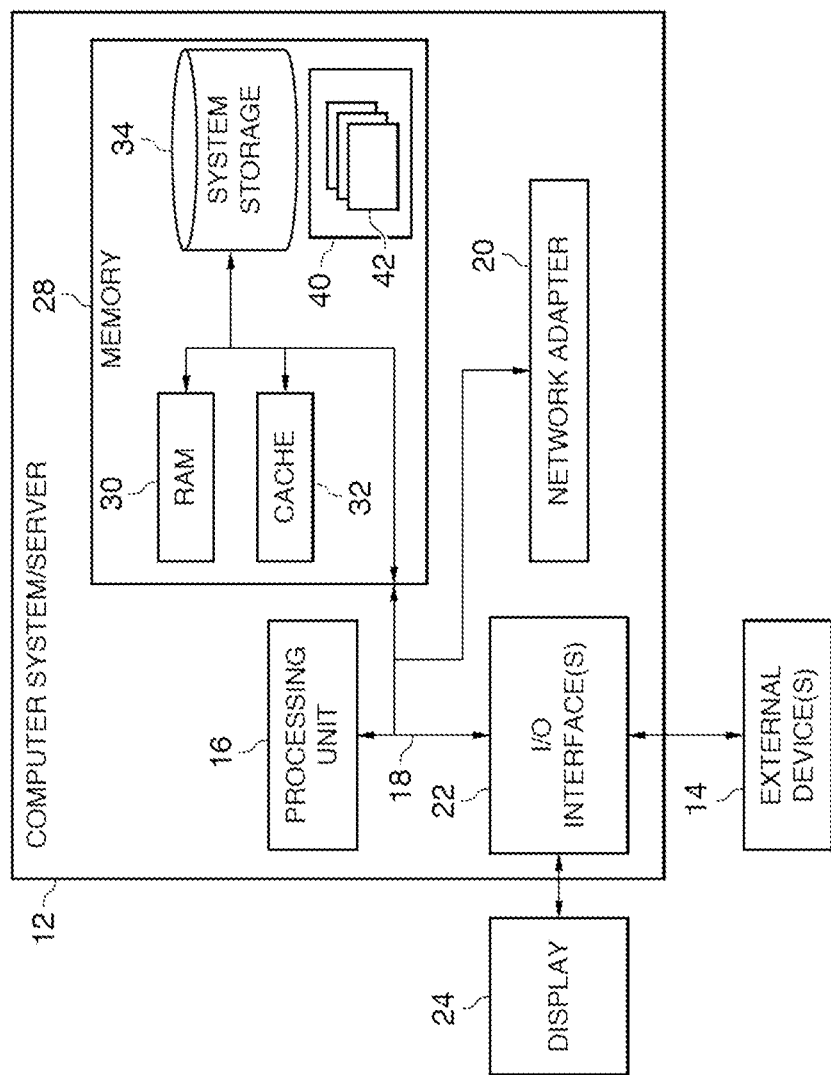
FIG. 3 depicts an exemplary block diagram depicting the hardware components of the digital file naming system 100 of FIG. 1, in accordance with the exemplary embodiments.

FIG. 3 depicts a block diagram of devices within the digital file namer 134 of the digital file naming system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
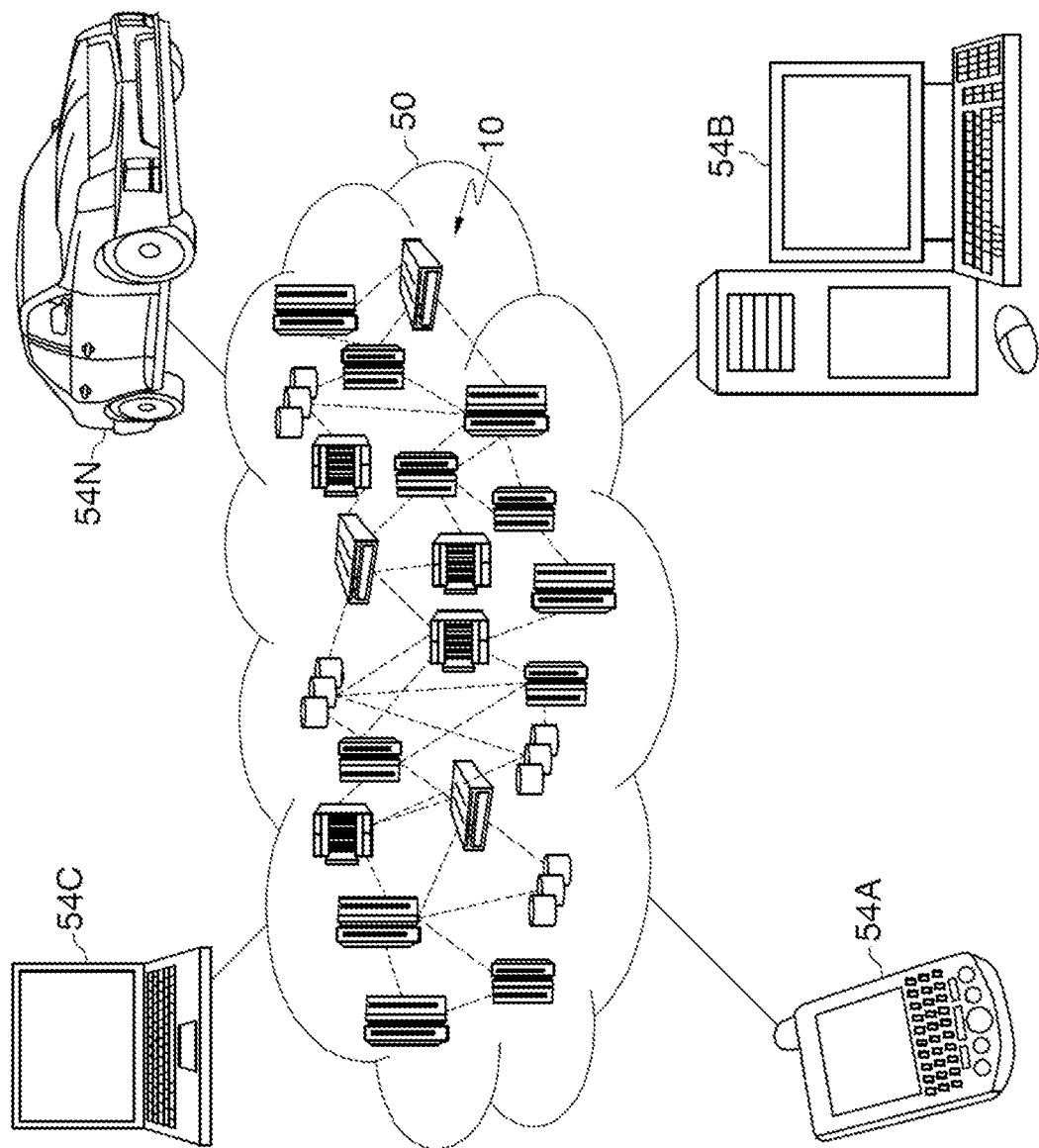
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
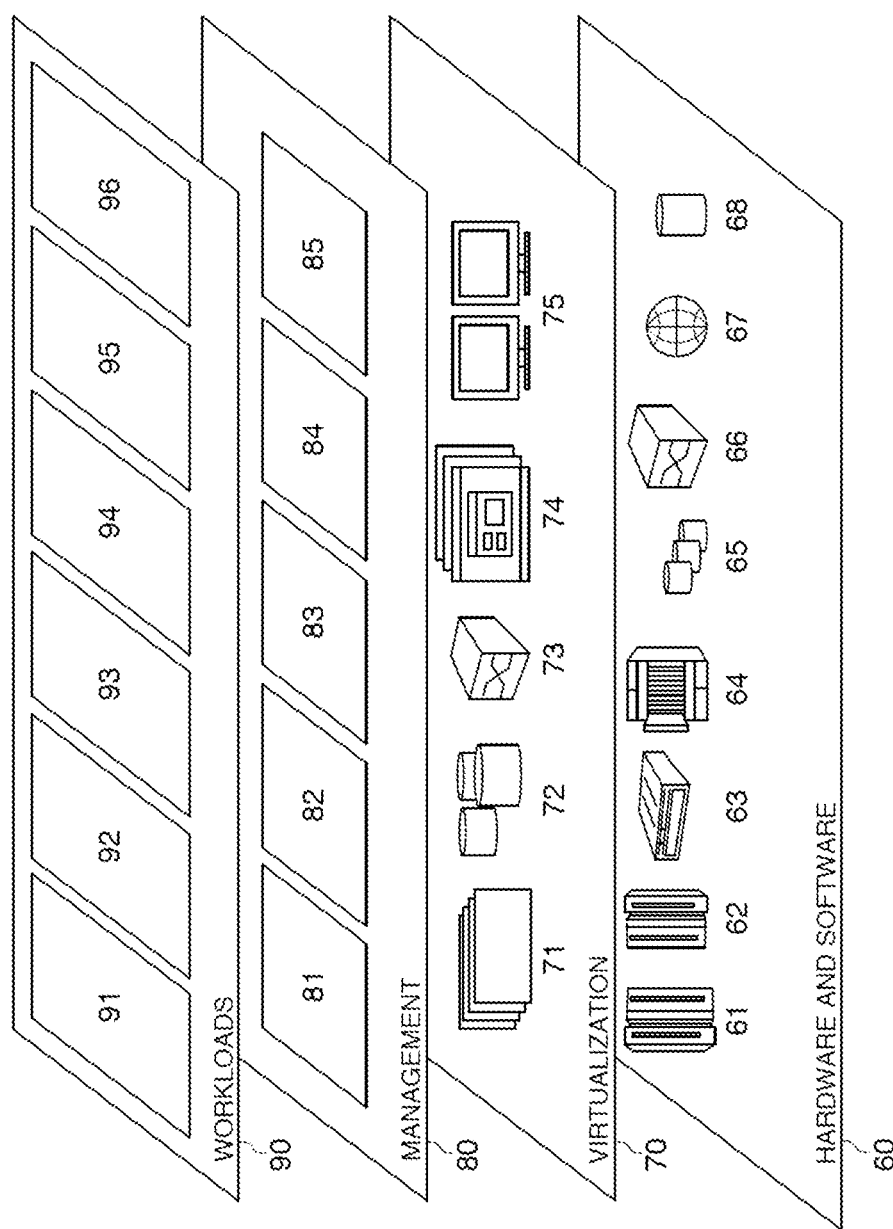
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital file naming 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for naming a digital file, the method comprising:
   detecting a user saving an unnamed digital file to a digital folder;
   extracting one or more first features from data collected from one or more named digital files within the digital folder;
   generating one or more models correlating the extracted one or more first features with one or more names of the one or more named digital files;
   extracting one or more second features from the unnamed digital file; and
   determining a name for the unnamed digital file based on applying the one or more models to the extracted one or more second features,
   wherein the extracting one or more first features and extracting one or more second features are capable of being performed concurrently; and
   wherein the one or more first features and the one or more second features each include one or more features selected from the group consisting of a physical location where the unnamed digital file was created, file size, a visual representation of a particular person, and the voice of a particular person.

2. The method of claim 1, further comprising:
   changing the name of the unnamed digital file to the determined name.

3. The method of claim 1, further comprising:
   based on determining that the digital folder does not contain the one or more named digital files, extracting the one or more first features from the digital folder.

4. The method of claim 3, wherein the one or more first features include at least one of a name of the digital folder and one or more names of parent folders of the digital folder.

5. The method of claim 1, further comprising:
   based on determining the name for the unnamed digital file, notifying or suggesting to the user the determined name before naming the unnamed digital file according to the determined name.

6. The method of claim 1, further comprising:
   receiving feedback indicative of whether the unnamed digital file was appropriately named or receiving feedback indicative of whether the user named the unnamed digital file according to the determined name; and
   adjusting the model based on the received feedback.

7. The method of claim 1, wherein the one or more first features or the one or more second features include a visual representation of a particular person.

8. A computer program product for naming a digital file, the computer program product comprising:
   one or more non-transitory computer-readable storage media and program instructions stored on the one or more non-transitory computer-readable storage media capable of performing a method, the method comprising:
   detecting a user saving an unnamed digital file to a digital folder;
   extracting one or more first features from data collected from one or more named digital files within the digital folder;
   generating one or more models correlating the extracted one or more first features with one or more names of the one or more named digital files;
   extracting one or more second features from the unnamed digital file; and
   determining a name for the unnamed digital file based on applying the one or more models to the extracted one or more second features,
   wherein the extracting one or more first features and extracting one or more second features are capable of being performed concurrently; and
   wherein the one or more first features and the one or more second features each include one or more features selected from the group consisting of a physical location where the unnamed digital file was created, file size, a visual representation of a particular person, and the voice of a particular person.

9. The computer program product of claim 8, further comprising:
   changing the name of the unnamed digital file to the determined name.

10. The computer program product of claim 8, further comprising:
    based on determining that the digital folder does not contain the one or more named digital files, extracting the one or more first features from the digital folder.

11. The computer program product of claim 10, wherein the one or more first features include at least one of a name of the digital folder and one or more names of parent folders of the digital folder.

12. The computer program product of claim 8, further comprising:
    based on determining the name for the unnamed digital file, notifying or suggesting to the user the determined name before naming the unnamed digital file according to the determined name.

13. The computer program product of claim 8, further comprising:
    receiving feedback indicative of whether the unnamed digital file was appropriately named or receiving feedback indicative of whether the user named the unnamed digital file according to the determined name; and
    adjusting the model based on the received feedback.

14. The computer program product of claim 8, wherein the one or more first features or the one or more second features include a visual representation of a particular person.

15. A computer system for naming a digital file, the computer system comprising:
    one or more computer processors, one or more computer-readable storage media, and program instructions stored on the one or more of the computer-readable storage media for execution by at least one of the one or more processors capable of performing a method, the method comprising:
    detecting a user saving an unnamed digital file to a digital folder;
    extracting one or more first features from data collected from one or more named digital files within the digital folder;
    generating one or more models correlating the extracted one or more first features with one or more names of the one or more named digital files;
    extracting one or more second features from the unnamed digital file; and
    determining a name for the unnamed digital file based on applying the one or more models to the extracted one or more second features, wherein the extracting one or more first features and extracting one or more second features are capable of being performed concurrently; and wherein the one or more first features and the one or more second features each include one or more features selected from the group consisting of a physical location where the unnamed digital file was created, file size, a visual representation of a particular person, and the voice of a particular person.

16. The computer system of claim 15, further comprising:
changing the name of the unnamed digital file to the determined name.

17. The computer system of claim 15, further comprising:
based on determining that the digital folder does not contain the one or more named digital files, extracting the one or more first features from the digital folder.

18. The computer system of claim 17, wherein the one or more first features include at least one of a name of the digital folder and one or more names of parent folders of the digital folder.

19. The computer system of claim 15, further comprising:
based on determining the name for the unnamed digital file, notifying or suggesting to the user the determined name before naming the unnamed digital file according to the determined name.

20. The computer system of claim 15, further comprising:
receiving feedback indicative of whether the unnamed digital file was appropriately named or receiving feedback indicative of whether the user named the unnamed digital file according to the determined name; and
adjusting the model based on the received feedback.

* * * * *